3,036,099
HYDROGENATION PROCESS

Fred O. Barrett, Glendale, and Charles G. Goebel, Cincinnati, Ohio, assignors to Emery Industries, Inc., Cincinnati, Ohio, a corporation of Ohio
No Drawing. Filed Aug. 5, 1959, Ser. No. 831,704
4 Claims. (Cl. 260—409)

This invention relates to a process for the hydrogenation of organic compounds in general and fatty acids in particular containing: (a) keto groups, (b) lactone groups, or (c) secondary or tertiary hydroxyl groups or esters of these groups.

Fatty acids are nomally hydrogenated for the purpose of converting unsaturated fatty acids such as oleic, linoleic or linolenic acids to more saturated acids by bringing about the addition of hydrogen to the double bonds. The hydrogenation process is performed by subjecting the fatty acids to hydrogen gas under pressure in the presence of a hydrogenation catalyst. The catalyst almost universally used is nickel which is produced in a finely divided and activated form by various processes, for example, by digesting a nickel aluminum alloy with caustic solution by which the aluminum is dissolved leaving finely divided nickel known as Raney nickel. Nickel hydroxide may be heated with hydrogen gas and reduced to finely divided nickel or nickel formate or carbonate may be decomposed by heat to form a very active catalyst.

Regardless of the method of manufacture, the nickel catalysts are very specific in their function in that they are extremely efficient in bringing about the addition of hydrogen at double bonds but show little activity towards other groups such as hydroxyl groups which are generally considered as reducible. The fact that nickel catalysts are so specific in their behavior is, for most purposes, no disadvantage as the reasons for hydrogenation are either to improve stability by eliminating reactive double bonds or to raise the titer or melting point by converting liquid unsaturated acids to solid saturated acids.

There are, however, certain fatty acids occurring in nature which contain keto or hydroxyl groups such as 4-keto stearic acid and ricinoleic acid from which it may be desirable to eliminate the keto or hydroxyl group. Further, in the processing steps for the production of fatty acids involving heat, appreciable quantities of lactones are often formed. These materials are generally undesirable as they lower the free acid content of the fatty acids and are much less reactive than fatty acids in many uses, for example, in saponification for the formation of soaps.

Although the process of this invention may be used on any fatty compound which contains a keto, secondary or tertiary hydroxyl, interester or lactone group, the process is particularly adapted to be used on the products which are produced by the practice of the process of polymerizing unsaturated fatty acids as disclosed in U.S. Patents Nos. 2,793,219 and 2,793,220. In these processes, monounsaturated or polyunsaturated fatty acids are heated with a crystalline clay mineral whereby substantially 40-60 percent of the fatty acids are polymerized into dimeric and trimeric fatty acids. Substantial portions of the unpolymerized fatty acids are structurally modified in the processes of the patent and are found to contain keto, secondary or tertiary hydroxyl, or lactone groups in addition to materials generally referred to as interesters. The term interester in this case refers to a secondary alcohol ester formed between two molecules of fatty acids, probably by the addition of the carboxyl group of one molecule to the carbon to carbon double bond of another molecule. The polymerized fatty acids also usually contain small amounts of interester.

The process of this invention may be used on the unpolymerized fatty acids or on the polymerized fatty acids or on the total product of the patented methods prior to distillation of the unpolymerized fatty acids from the polymerized fatty acids. In all cases, the specified groups are modified and the compounds converted to saturated fatty acids. The method of this invention may also be practiced upon any other chemicals which contain any of the specified groups as undesirable impurities.

It is the purpose of this invention to provide a method by which oxygen, when present in the form of secondary or tertiary hydroxyl or ketonic groups, may be completely removed and replaced by hydrogen.

It is also the purpose of this invention to provide a method for improving the quality of fatty acids by converting lactones and interesters, which may be formed during processing, to the free acids.

It is the further purpose of this invention to provide a method for the total reduction of ketones whether or not as a part of a fatty acid molecule.

If unsaturated compounds containing secondary or tertiary hydroxyl groups, interesters or lactones are hydrogenated with a nickel catalyst alone, no reaction will be obtained except that the double bonds will become saturated. Ketones will be hydrogenated to the secondary alcohol but the reaction will proceed no further. For example, the hydrogenation of ricinoleic acid containing an hydroxyl group and a double bond yields 12-hydroxystearic acid, i.e. the double bond becomes saturated but the hydroxyl group is unchanged.

We have found, however, that if the hydrogenation of compounds containing keto or secondary or tertiary hydroxyl groups is carried out in the presence of an active clay, the oxygenated groups are converted to the corresponding saturated hydrocarbon groups. Similarly, compounds containing lactones and interester groups are converted to the corresponding saturated fatty acids. The reaction may be carried out with any of the conventional nickel catalysts such as Raney nickel, nickel from nickel formate or earth supported nickel catalysts. The amount of nickel required may range from a few tenths of a percent to as high as 3%, the optimum amount being dependent upon many other factors such as temperatures and pressure of hydrogen available, presence or absence of catalyst poisons and the desired completeness of the hydrogenation. These same factors must be considered in determining the optimum amount of catalyst in any hydrogenation and in this respect hydrogenation in the presence of active clay is no different from any ordinary hydrogenation.

The temperatures employed are not critical but must be above the activation temperature of the particular catalyst employed. Until a certain minimum temperature is reached, nickel catalysts will show practically no activity but at temperatures usually between 150 and 250° C. the catalyst becomes acitve but the activity increases only moderately with further increases in temperature.

The clay employed in our invention is of the montmorillonite type which is either naturally active or artificially activated by acid treatment. Suitable clays are those sold under the trade name Filtrol by the Filtrol Corporation. From 1 to 10% based on the weight of the material to be hydrogenated is employed.

If the reaction is carried out on saturated ketones, or secondary or tertiary alcohols, the only reaction which takes place is the elimination of the oxygen containing group. If the material being treated is also unsaturated, saturation of the unsaturated bonds also occurs. Thus, if an unsaturated or partially unsaturated fatty acid which also contains some undesired lactone is treated by the process of our invention, the unsaturation and the undesirable lactones may both be removed by a single processing step.

In general, therefore, our process involves introducing the material to be hydrogenated together with .2 to 6% nickel catalyst and from 2 to 10% clay into a pressure vessel equipped with an agitator to keep the catalyst and clay in suspension. The charge is then heated to 150 to 250° C. and, after purging to remove air, hydrogen is introduced at 200–600 lbs. pressure. As hydrogenation reactions are exothermic it may be necessary to cool to maintain the temperature within the desired limits. The temperature and pressure are maintained until the hydrogenation is completed which may require from 2 to 12 hours. From time to time it may be necessary or desirable to vent off the water liberated by the reaction in order to force the reaction to completion. When the hydrogenation is complete as determined by appropriate tests, the pressure is released and the product filtered to remove the clay and catalyst.

Although we do not wish to be limited by the following explanation, we believe that activated clays facilitate the hydrogenation of compounds containing secondary or tertiary hydroxyl, ketonic or lactone oxygen, first, because of their ability to catalyze the hydrolysis of lactones with the formation of hydroxyl and carboxyl groups; secondly, the active clays are effective in bringing about the elimination of water between a secondary or tertiary hydroxyl group and the hydrogen of an adjacent carbon with the formation of a double bond which is then hydrogenated in the normal fashion.

The almost immediate hydrogenation of the double bonds, formed as the result of the elimination of water, to saturated bonds prevents reversal of the reaction and causes it to go to completion. The treatment with active clay and the hydrogenation must, therefore, be concurrent rather than successive steps.

In the case of ketones or keto groups in polyfunctional materials the first step is hydrogenation to a secondary alcohol followed by the previously described steps.

Our invention therefore may be employed to eliminate secondary or tertiary free or esterified hydroxy groups or lactones or ketones. Any hydroxyl groups originally present or formed during hydrogenation are replaced by hydrogens. The process is directed primarily to the processing of fatty acids containing these groups but we have found the reaction to be of general utility for all types of organic compounds containing these groups. The reaction may, therefore, be used as a step in organic synthesis or as a means for the removal of undesired impurities. Thus, it may be used to eliminate lactones which may be formed during the distillation of fatty acids or to eliminate the lactones present in the unpolymerized fatty acids remaining after the dimerization of mono- or polyunsaturated fatty acids as disclosed in U.S. Patents 2,793,219 and 2,793,220.

Our invention is more fully illustrated by the following examples:

Example 1

Distilled 4-ketostearic acid containing a small amount of unsaturated lactone and having a neutralization equivalent of 340, a saponification equivalent of 292, a titer of 81° C. and a refractive index of 1.4238 at 90° C. was hydrogenated in a small rocking type autoclave for 10 hours at 300 p.s.i. pressure and a temperature of 230° C. in the presence of 6% Filtrol and 1.5% supported nickel (Harshaw 0104P). Water was vented from the autoclave at intervals to force the reaction to completion. After cooling, the contents of the autoclave were sludged with 0.2% of 75% phosphoric acid, filtered to remove suspended nickel and Filtrol, and distilled removing a small (4%) top cut. The main distillate (87.8% of still feed) proved to be a good grade of stearic acid as shown by the following analysis:

Neutralization equivalent 284, saponification equivalent 284, boiling range at 1–2 mm. Hg 175–180° C., refractive index at 70° C. 1.4328, at 90° C. 1.4268 and titer 66° C. The literature (Ralston—Fatty Acids and Their Derivatives) gives the following characteristics for pure stearic acid: Molecular weight 284.46, boiling point 173.7° C. at 1 mm. Hg, a refractive index at 70° C. of 1.4332 and a melting point of 69.6° C.

Example 2

Commercial grade 12-hydroxystearic acid was hydrogenated in a small stirring-type autoclave for 5 hours at 230° C. and a pressure of 300 p.s.i. in the presence of 6% Filtrol and 2% Raney nickel. Water was vented from the autoclave at intervals. After cooling, the contents of the autoclave were sludged with 0.2% of 75% phosphoric acid, filtered and distilled removing a small top cut. The following analysis provided the distillate to be stearic acid:

| Material | Percent | N.E. | S.E. | I.V. | Hydroxyl value | ° C. Titer |
|---|---|---|---|---|---|---|
| Original | | 312 | 292 | 3.7 | 142 | 74 |
| Hydrogenated | 100 | 291 | 291 | | | |
| Hydrogenated and distilled [1] | 88 | 284 | 284 | 0.5 | 0 | 68 |

[1] Refractive Index at 70° C.=1.4330.

Example 3

100 parts of the monomeric distillate resulting from the dimerization of tall oil acids in accordance with U.S. Patent 2,793,220 and having the following characteristics: neutralization equivalent 325, saponification equivalent 298 and iodine value 66.2 was hydrogenated for 6 hours at 300 lbs. pressure and a temperature of 230° C. in the presence of 6% Filtrol and 2% Raney nickel. The hydrogenated product after cooling was sludged with 0.2% of 75% phosphoric acid to remove dissolved nickel and then filtered to remove suspended nickel and Filtrol. The product was top distilled and yielded 83.8% of distilled acids having a neutralization equivalent of 285 and a saponification equivalent of 284 and an iodine value of 1.6. The decrease in saponification equivalent of 14 points is brought about by the removal of unsaponifiable matter during the distillation but the additional drop of 26 points in neutralization equivalent represents the conversion of lactones to free acids.

Example 4

A synthetic mixture consisting of 60% crude stearolactone and 40% stearic acid was treated for 5 hours at 300 lbs. hydrogen pressure and a temperature of 230° C. in the presence of 4% Filtrol, 1% of supported nickel catalyst (Harshaw 0104P). The hydrogenated product was cooled, filtered to remove catalyst and distilled. The results are shown in tabular form:

| Material | Percent | I.V. | N.E. | S.E. | Percent FFA |
|---|---|---|---|---|---|
| Original | | 13.5 | 420 | 270 | 64.3 |
| Hydrogenated | 100 | 7.1 | 285 | 275 | 96.5 |
| Distilled | 98.3 | 5.9 | 282 | 275 | 97.5 |
| Residue | 2.7 | | 488 | | |

Example 5

A sample of methyl heptyl ketone was hydrogenated in the presence of 6% Filtrol and 1.5% supported nickel catalyst at 230° C. and 300 lbs. pressure. The water formed during the reaction was removed from time to time by venting the autoclave. After 10 hours the product was cooled, filtered to remove the catalyst and active clay and distilled under 20 mm. vacuum. From 100 parts of original ketone containing 94.3% ketone and having a refractive index of 1.4202 at 20° C. there was obtained 57.2 parts of product distilling between 52 and 53° C., 20 mm. Hg, and having a refractive index of 1.4058 at 20° C.

Normal nonane, the expected product, is stated to boil at 51° C. at 20 mm. Hg and have a refractive index of 1.4054 at 20° C.

*Example 6*

In order to demonstrate the splitting effect upon the ester group of the interester type, oleic interester (prepared from oleic acid-$BF_3$ reaction) was reduced in the presence of 4% Grade 98 Filtrol, 1% nickel (Harshaw 0104P), 230° C., 300 lbs./in.$^2$ hydrogen pressure, 2¼ hrs. Reaction was rapid. Hydrogenated product was filtered and distilled.

| Material | Percent | I.V. | N.E. | S.E. | ° C. Titer | Percent unsap. |
|---|---|---|---|---|---|---|
| Orig. ester | | 46.5 | 647 | 307 | | |
| Hydrog. prod | 100.0 | 5.2 | 287 | 281 | | |
| Dist | 84.3 | 0.76 | 278 | 277 | 63.0 | 0.34 |
| Residue | 15.7 | 29.0 | 346 | 316 | | |

The invention herein disclosed may be practiced on any aliphatic oxygenated compound of the class indicated. However, the process is particularly adapted to be practiced upon fatty acids, for instance, fatty acids having a chain length of 16-18 carbon atoms or polymers thereof, wherein the oxygenated components are of the chain length of the acids and cannot be readily removed by distillation. If the process of the invention is so used, the oxygenated components are eliminated as impurities and are converted to fatty acids of lower I.V. or saturated fatty acids. In either case, the increase in the free acid content of the material treated increases its utility and value.

Having described our invention, we claim:

1. The method wherein oxygenated, fatty acid impurities formed during polymerization of unsaturated fatty acids and contained in the resulting polymer-containing reaction product are converted to saturated fatty acids, which comprises treating at least a portion of said reaction product with an active nickel catalyst and hydrogen under pressure in the presence of from 1 to 10% of active clay, said percentage being based on the weight of material being hydrogenated.

2. The method of claim 1 in which the material being treated comprises substantially the entire polymer-containing reaction mixture.

3. The method of claim 1 wherein the material being treated comprises the non-polymerized fatty acid portion of the reaction product.

4. The method of claim 1 wherein the material being treated comprises the polymerized fatty acid portion of the reaction product.

References Cited in the file of this patent

UNITED STATES PATENTS

| | | |
|---|---|---|
| 2,156,737 | Priester | May 2, 1939 |
| 2,715,641 | Opie | Aug. 16, 1958 |